United States Patent
Smetz et al.

(10) Patent No.: US 8,807,617 B2
(45) Date of Patent: Aug. 19, 2014

(54) LOAD RING HAVING AN AXIAL SECURING ELEMENT

(75) Inventors: Reinhard Smetz, Nordlingen-Kleinerdlingen (DE); Michael Betzler, Abtsgmund (DE)

(73) Assignee: RUD Ketten Rieger & Dietz GmbH. u. Co. KG, Aalen (DE)

( * ) Notice: Subject to any disclaimer, the term of this patent is extended or adjusted under 35 U.S.C. 154(b) by 55 days.

(21) Appl. No.: 13/261,203

(22) PCT Filed: Aug. 6, 2010

(86) PCT No.: PCT/EP2010/004821
§ 371 (c)(1), (2), (4) Date: May 11, 2012

(87) PCT Pub. No.: WO2011/029505
PCT Pub. Date: Mar. 17, 2011

(65) Prior Publication Data
US 2012/0223539 A1    Sep. 6, 2012

(30) Foreign Application Priority Data
Sep. 8, 2009  (DE) .................. 10 2009 040 524

(51) Int. Cl.
*B66C 1/10* (2006.01)
*B60P 7/08* (2006.01)
*B66C 1/66* (2006.01)

(52) U.S. Cl.
CPC *B66C 1/66* (2013.01); *B60P 7/0807* (2013.01)
USPC ............................. 294/215; 294/82.1; 410/101

(58) Field of Classification Search
USPC ......... 294/215, 82.1; 410/101, 106, 107, 111, 410/116; 52/125.2; 403/78, 79, 150
See application file for complete search history.

(56) References Cited

U.S. PATENT DOCUMENTS

| | | | | | |
|---|---|---|---|---|---|
| 4,607,991 | A | * | 8/1986 | Porter | 410/110 |
| 5,103,755 | A | * | 4/1992 | Garrett | 116/200 |
| 5,248,176 | A | * | 9/1993 | Fredriksson | 294/215 |
| 5,975,786 | A | * | 11/1999 | Chang | 403/78 |
| 6,032,993 | A | * | 3/2000 | Kwon | 294/215 |
| 6,065,917 | A | * | 5/2000 | Shambeau et al. | 410/107 |
| 6,547,474 | B1 | * | 4/2003 | Smetz | 403/78 |
| 6,953,212 | B2 | * | 10/2005 | Alba | 294/217 |
| 7,036,858 | B2 | * | 5/2006 | Buck | 294/215 |
| 7,086,815 | B2 | * | 8/2006 | Bruns | 410/107 |
| D552,530 | S | * | 10/2007 | Kirkpatrick | D12/223 |

FOREIGN PATENT DOCUMENTS

| | | |
|---|---|---|
| DE | 89 05 860 U1 | 9/1990 |
| DE | 197 16 734 A1 | 1/1998 |
| DE | 298 16 462 U1 | 12/1998 |
| DE | 20 2005 012945 U1 | 10/2005 |

* cited by examiner

*Primary Examiner* — Dean Kramer
(74) *Attorney, Agent, or Firm* — Mark P. Stone

(57) ABSTRACT

A device for attaching, lifting, and/or lashing goods, has a load ring (1), the ring lug (2) of which has two retaining pins (7*a*, 7*b*) for connecting to fixing frames (3*a*, 3*b*), which in turn can be fastened to goods (4). A kit for a device having a load ring (1) and a method for producing the device are also provided. In order to ensure that the retaining pins (7*a*, 7*b*) are inserted far enough in the goods (4), the device has at least one axial securing element (X), by which one of the retaining pins (7*a*, 7*b*) is secured in a predetermined axial working position (P) in one of the retaining receptacles (8*a*, 8*b*).

30 Claims, 6 Drawing Sheets

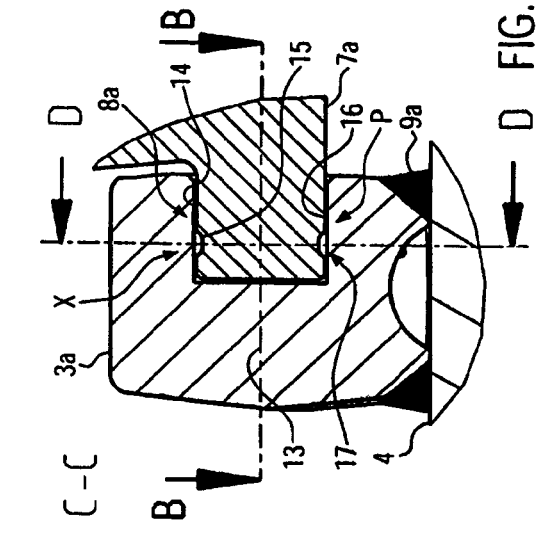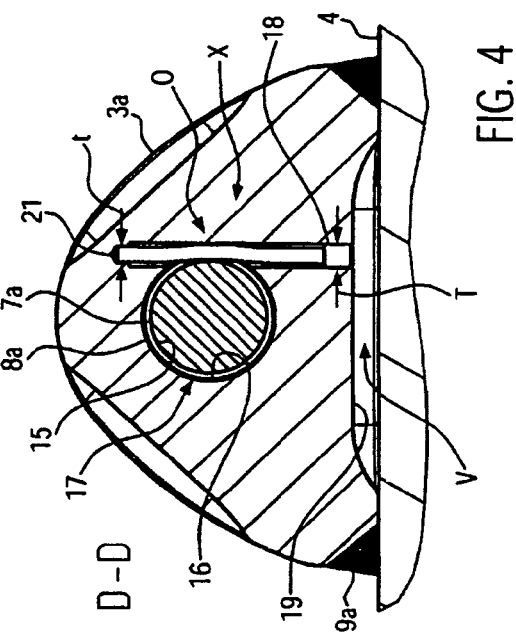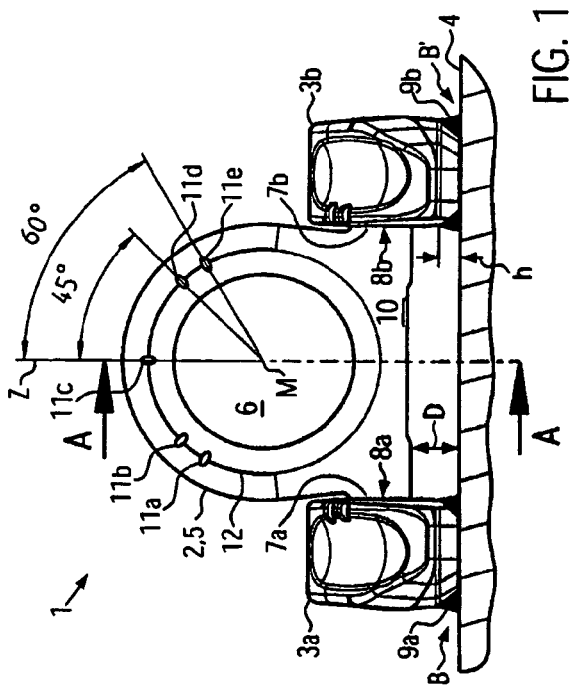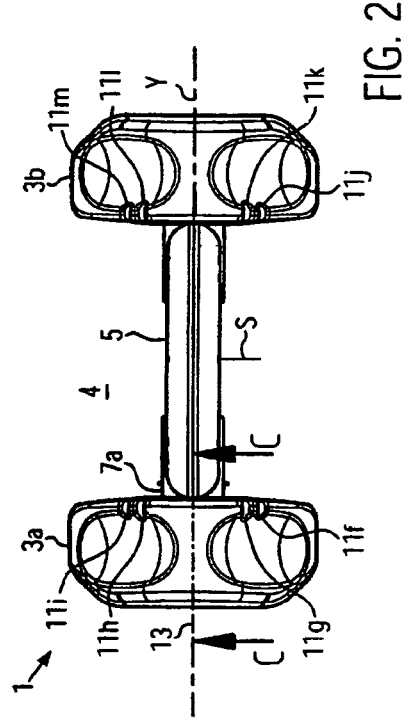

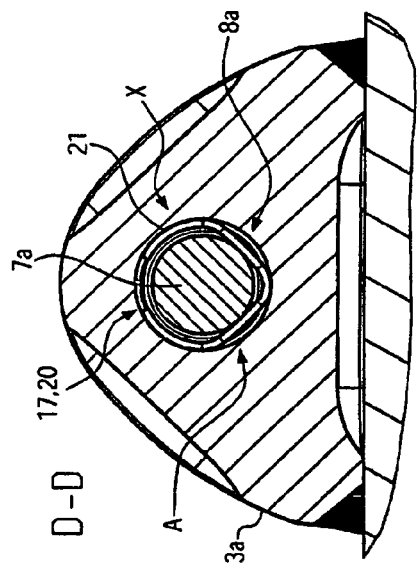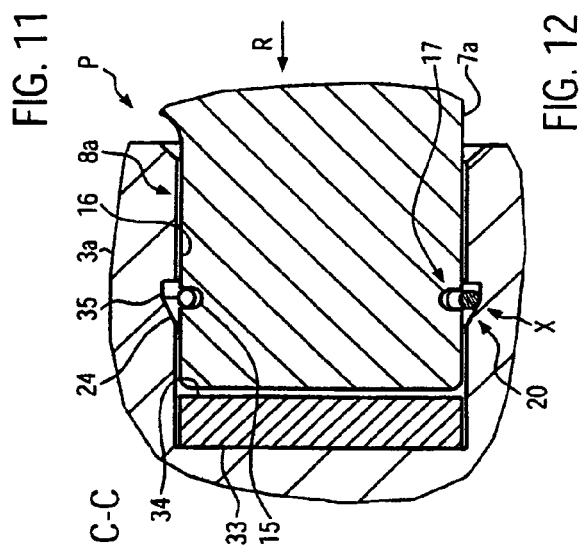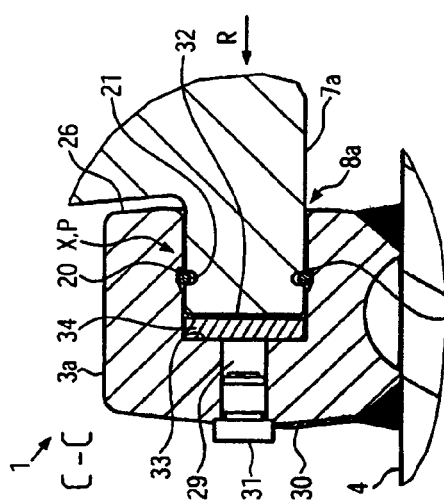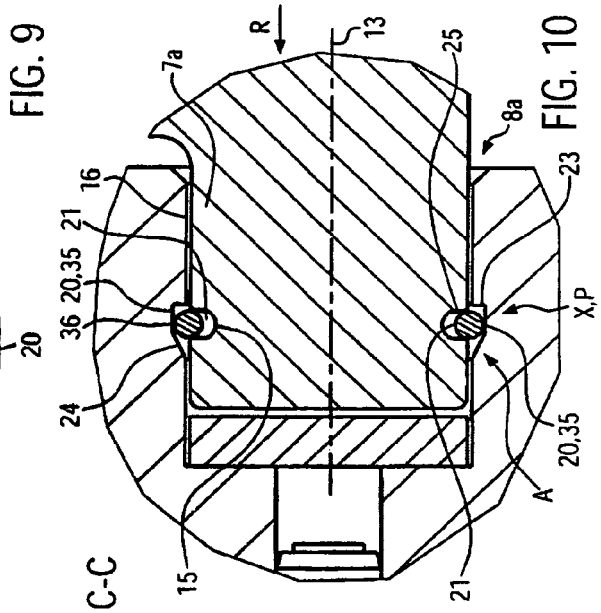

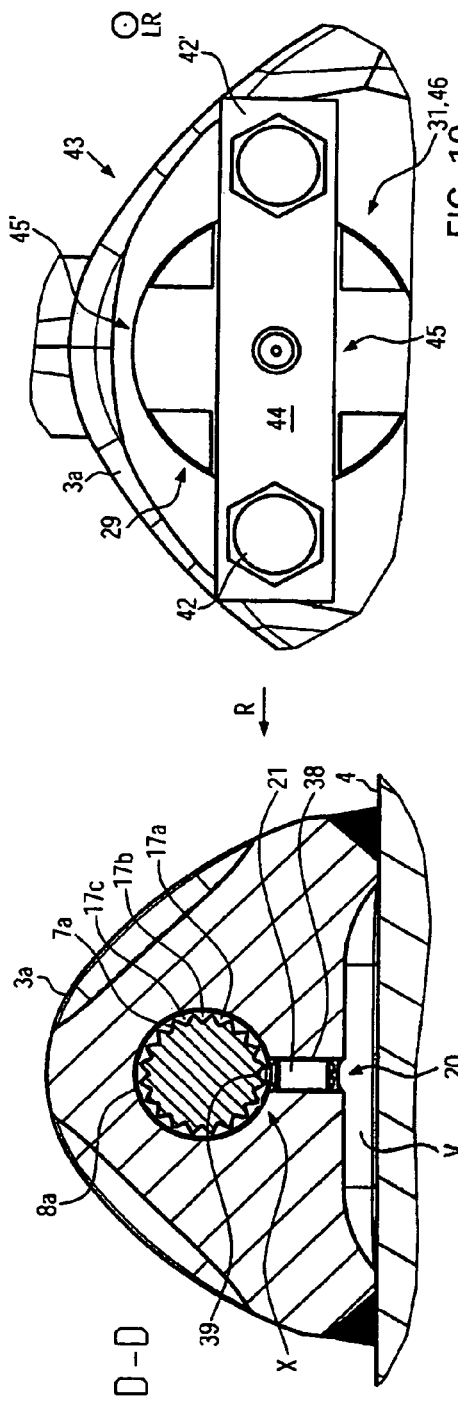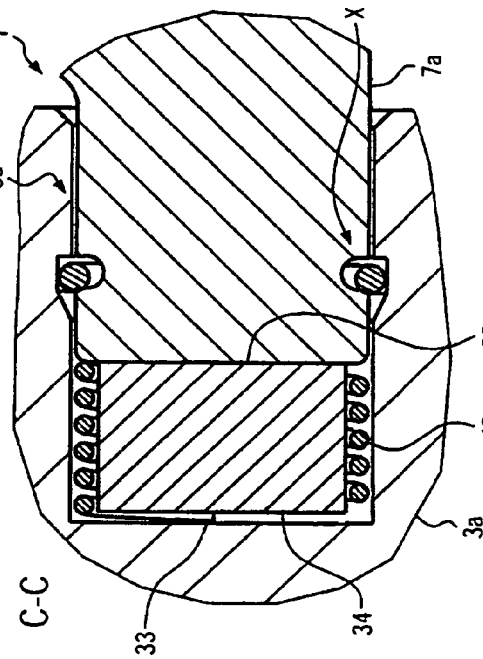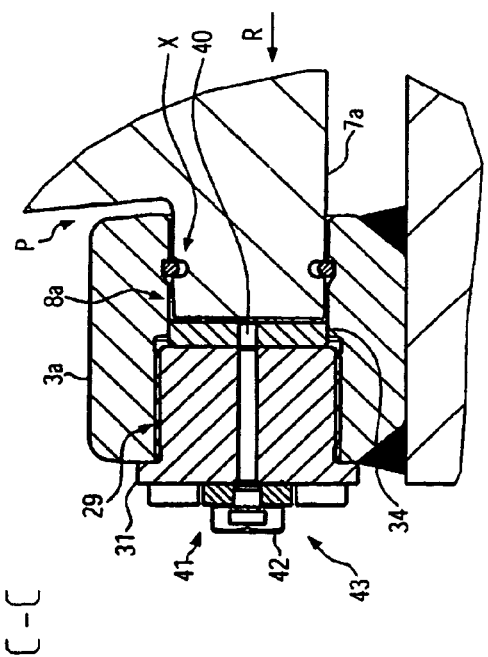

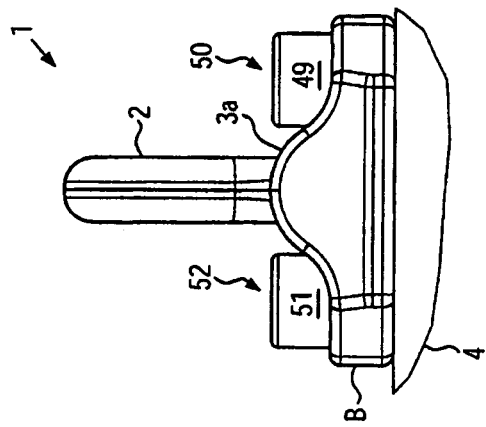
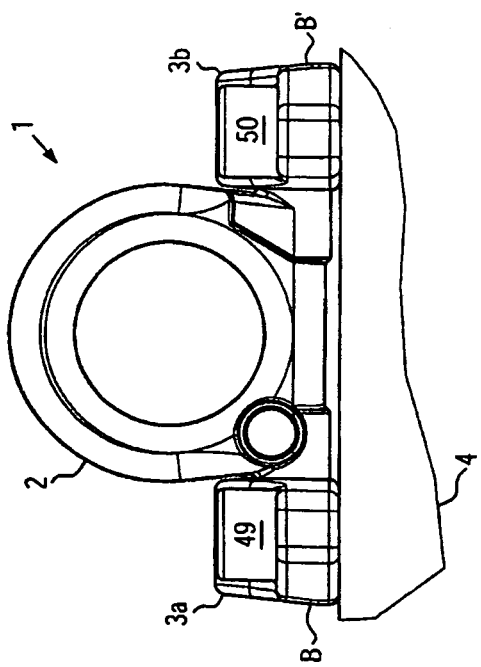

LOAD RING HAVING AN AXIAL SECURING ELEMENT

The invention relates to a device for attaching, lifting, and/or lashing goods, said device comprising a load ring having a ring lug with two retaining pins and two fixing frames that can be fixed to goods whereby each fixing frame has a retaining-receptacle in which the ring lug is held by way of its retaining pins.

The invention furthermore relates to a method for mounting a device for attaching, lifting, and/or lashing goods.

Devices that are for attaching, lifting, and/or lashing goods and that comprise a load ring are generally known. The fixing frames are fixed to the goods, for example, an overseas container, whereby the fixing frames can, for example, be welded or screwed to the goods. Before the fixing frames are attached to the goods, they must be put onto the two retaining pins of the ring lug. If the retaining pins face away from each other and if they are fixed in place on the goods such that they are slid into the fixing frames up to a working position, the fixing frames limit movements of the ring lug parallel to a longitudinal axis of the retaining pins. The retaining pins can no longer be removed from the retaining receptacles of the fixing frames and the fixing frames fixed in place on the goods can no longer be displaced.

For safety and reliability during the attaching, lifting, and/or lashing process, it is important that the retaining pins engage in an insertion direction far enough into the retaining receptacles and that consequently an overloading of the retaining pins during operation is avoided. The maximum engagement of the retaining pins into the retaining receptacles is determined by the fixing of the fixing frames to the goods, and cannot be altered subsequently without destroying and reproducing the fixing in place. In practical application, it happens that the fixing frames are fixed to the goods spaced too far apart from each other and at least one of the retaining pins juts only inadequately into the retaining receptacle. This inadequate connection between the retaining pin and retaining receptacle can cause the retaining pin to break during operation, as a result of which the goods, for example, during a lifting process, fall and endanger people or objects.

The object of the invention is therefore to provide a device whose load ring is easier to mount and that guarantees greater safety and reliability during the attaching, lifting, and/or lashing processes.

For the device mentioned at the beginning, this object is solved according to the invention by means of at least one axial securing element, by means of which the retaining pin is secured in the retaining receptacle in a predetermined axial working position. For the method mentioned at the beginning, the object is solved by means of immobilizing the retaining pin in the retaining receptacle in the axial direction.

The retaining pin is secured against unwanted axial displacements in the working position by means of this simple measure. The axial securing element or axial immobilization additionally allows a simple and safe pre-assembly of the load ring. The fixing frames are already positioned in the working position before being attached to the goods so that they can no longer readily slip off the retaining pins. The pre-mounted load ring is useable as a single piece and can simply be connected to the goods without there being a risk of attaching the fixing frames too far apart from each other.

The solution according to the invention can be further improved by means of different embodiments, each advantageous in itself and all combinable in any way with one another. These development forms and the advantages associated with them are discussed in the following, whereby the design measures and their effects are described only by way of example for one retaining pin and one retaining receptacle. Naturally both retaining pins of the ring lug and the retaining receptacles of the two fixing frames can have the following advantageous developments.

In order to connect the fixing frame that was put onto the retaining pin to the ring lug and secure it against an unwanted displacement, the fixing frame and the retaining pin can be arrested in the working position by way of the axial securing element. The arresting can take place by means of a latching mechanism and/or threaded joint.

The axial securing element can furthermore have a retaining element and a reception volume formed in the retaining pin and/or in the fixing frame, into which reception volume the retaining element juts at least in the working position of the retaining pin. The retaining element, preferably held in the axial direction in a positive locking and undisplaceable manner, serves to secure the retaining pin and the retaining receptacle in the working position. This can be brought about by a positive locking or a friction locking, as is explained in the following. The retaining element can be manufactured from a metal and, for example, from steel.

In the case of a working position that is secured by means of a friction locking, the retaining element is preferably received in a partial volume of the reception volume that is located exclusively in the retaining pin or in the retaining receptacle. In the working position, the retaining element can preferably be pressed against a section of the retaining receptacle or the retaining pin, said section lying opposite the partial volume. The fixing frame can consequently no longer slide from the retaining pin and the retaining pin is secured in its working position. To produce the friction locking and the contact force necessary for it, the retaining element can be elastically deformed in the working position. It is especially advantageous if the retaining element deforms under the influence of the retaining pin and/or the retaining receptacle and applies a counter-force, as a result of which the friction locking is strengthened. For example, the retaining element can be manufactured from spring steel.

Because a securing of the axial position of the retaining pin by means of a friction locking is not sufficient in all cases, the securing can also take place in a positive locking manner. For this purpose, in each case at least a partial volume of the reception volume can be formed both in the retaining pin and in the retaining receptacle, whereby the partial volumes of the retaining pin and retaining receptacle can be adjacent to each other in the working position, or can even merge into each other. In this development, the retaining element is consequently held both in the retaining pin and in the retaining receptacle, and in this way produces a positive locking connection between the two. The retaining pin and the fixing frame are consequently arrested or latched by means of the retaining element, as a result of which the retaining pin is fixed in its axial working position in an even more stable manner.

Regardless of whether or not the axial securing of the working position is brought about by a friction locking or a positive locking, the retaining element can produce a friction locking in the circumferential direction. The ring lug can consequently be connected to the fixing frame in one development in such a manner that it can be pivoted or rotated around the longitudinal axis of the retaining pin in order to optimally take up or absorb the loads that arise during operation. For this purpose, the retaining receptacles can form pivot bearings for the retaining pins. If the retaining element that is radially pre-tensioned in the working position presses against the retaining pin and/or the retaining receptacle, the friction locking acts on the rotational movement and damps it.

Should the friction locking, brought about by the radially elastic tension, of the retaining element with the retaining pin and/or the retaining receptacle be too small, the retaining element can additionally be pressed against some of the wall sections of the recesses. In this way, an axial friction locking is additionally generated.

For this purpose, a spring element, for example, a coil spring, can be arranged between the base of the retaining receptacle and the front face. This coil spring can attempt to press the retaining pin out of the retaining receptacle, as a result of which the retaining element is pressed against wall sections of the partial volumes of both the retaining pin and the retaining receptacle. In this way, the friction brought about by the axial securing element is increased.

The retaining element can be developed in a radially elastic manner and can be pressed into the partial volume. If the reception volume comprises two partial volumes that lie opposite each other in the working position, the radially elastically deformed retaining element can at least partially lose tension when the working position is reached and spring at least in sections into the partial volume lying opposite. The retaining element then juts into both partial volumes and arrests the retaining pin in a positive locking manner. If the retaining element is also radially elastically pre-tensioned in the working position, the friction locking is strengthened.

For simple assembly of the load ring, it can be advantageous if the retaining element can essentially completely dip into the partial volume provided in the retaining pin or the retaining receptacle while the retaining pin is being inserted into the fixing frame. Developing the retaining element elastically at least in the radial direction has proven to be useful for this purpose.

The partial volumes of the retaining pins and of the retaining receptacle can be developed in different manners and as described in the following.

In a first embodiment, the at least one partial volume can be formed at least in sections by, for example, groove-shaped recesses in the retaining pin and/or in the retaining receptacle. The recesses can be formed at least in sections with a ring shape and along a circumferential direction of the retaining pin, which is essentially cylindrical and especially circular-cylindrical. If both partial volumes are formed circumferentially, in one development they consequently combine in the working position into a continuous essentially ring- or torus-shaped reception volume.

Particularly if the retaining pin is to be rotatable around its longitudinal axis in the working position, it can be advantageous if the recess extends continuously along the entire circumference. The recess can have wall sections facing in and/or away from the insertion direction, whereby these wall sections can at least in sections be arranged perpendicular to the longitudinal axis and are used as locating surfaces.

According to a further advantageous aspect of the invention, it is possible to prevent the retaining element from being damaged if a stipulated axial force is exceeded. This is achieved in that the retaining element can be transferred into an evasion position arranged in one of the partial volumes, preferably in the particular opposing partial volume, whereby the retaining pin can be displaced past the holding element in the axial direction in this evasion position. In the evasion position, the retaining element can be elastically deformed and can exert an elastic compressive pressure on the retaining pin in order to reduce the axial force through the friction locking.

In order for it to be possible to move the retaining element into the evasion position without damage, at least individual wall sections of the recesses can be formed as, for example, ramp- or funnel-shaped, leading bevels extending in the axial direction. As a result of the axial force, the retaining element is pressed against the leading bevel and by means of this into the evasion position.

In particular, the front wall section of the recess of the retaining pin in the insertion direction can be formed as a leading bevel. In this development, if the retaining pin is pressed in the insertion direction from the working position further into the retaining receptacle, the leading bevel pushes the retaining element away from the pin and the retaining element swerves into the evasion position arranged in the partial volume of the fixing frame. If the wall element of the partial volume of the retaining receptacle that faces away from the insertion direction is formed in a ramp shape, the evasion position of the retaining element lies in the partial volume of the retaining pin.

In a further advantageous embodiment, the retaining pin can have a toothed gear-like cross-section at least in sections, whereby adjacent teeth can each delimit at least sections of a partial volume. In particular, the teeth can be arranged in the retaining groove and can be lower than or equally as high as the retaining groove. An elastically deflectable part of the retaining element can engage in this partial volume.

Particularly if the retaining pin has the toothed gear-shaped cross-section, the partial volume provided in the fixing frame can run radially to the retaining receptacle. The retaining element, for example, a spherical-headed screw, can be inserted into the radial partial volume of the fixing frame and it can engage in the opposite partial volume between the teeth. The retaining element juts into one of the partial volumes and consequently secures it in a positive or friction locking. The retaining element can, for example, be screwed into the partial volume of the fixing frame and/or it can be glued to this. The radially aligned partial volume of the fixing frame can naturally also be used with the other described or other retaining pins or ring lugs.

In a further embodiment, the partial volume provided in the fixing frame can intersect the retaining receptacle at its edge and be formed with a tubular shape.

The retaining elements can be formed in different manners as described in the following and can be used with at least one of the abovementioned partial volumes.

The retaining element can be complementary to the reception volume at least in sections.

A ring-shaped retaining element is particularly suitable for a reception volume running in the circumferential direction and such a retaining element can, for example, be formed as a deformable disc or as a snap ring and can simultaneously jut into the partial volume of the fixing frame and into the partial volume of the retaining pin. The retaining element can have a circular or also elliptical or corrugated or serrated shape. Particularly a disc with a serrated, corrugated or elliptical edge is suitable for this. The retaining element can be held in the reception volume in a radially or axially elastically pre-tensioned manner.

If the partial volume of the retaining receptacle has a tubular shape in particular, the retaining element can be formed, for example, with a pin-shaped form or as a cylindrical tension sleeve slotted along its longitudinal axis. The retaining element can jut into the retaining receptacle or into the partial volume provided in the retaining pin if this is arranged in the retaining receptacle in its working position.

Instead of a straight pin, the retaining element can also be formed as a bent wire section, for example, as a springy wire bracket. The ends of the wire section can be bent into a ring shape and placed or pressed onto fixing pins, particularly rigid ones, provided on the fixing frame. A central area of the wire section lying between the ends can jut into the retaining receptacle at least in a projection running in an axial direction and particularly can be arranged in an edge area of the retaining receptacle. The wire section can be manufactured from steel strip in order to achieve higher friction coefficients.

The fixing pins can run straight, particularly parallel to one another, and can connect the two fixing frames to one another or bridge the interspace between the fixing frames. For example, at least one of the fixing pins can be formed as a spacing rod whose length essentially determines a working distance between the two fixing frames. If the load ring is mounted and if the fixing frames are arranged at their working distance, the retaining pins are located in their working position.

For example, the at least one fixing pin can be inserted into pin receptacles provided in the fixing frames or can be connected to at least one of the fixing frames in a positive, frictional or substance-to-substance locking. If the two fixing frames are connected to the at least one fixing pin in an undisplaceable manner, the fixing frames are secured against relative axial movements with respect to each other. The at least one fixing pin, as a spacing rod, stipulates the distance between the fixing frames and forms the axial securing element by means of which the retaining pin is secured in the retaining receptacle in the predetermined axial working position.

Particularly if both fixing pins are formed as spacing rods, the wire section can be arranged on the fixing pins in particular between the fixing frames and, for example, can be connected to the fixing pins in a displaceable or also undisplaceable manner at least in the axial direction.

In the mounted state of the load ring, the wire section produces a friction locking with the ring lug, as a result of which free pivoting of the ring lug is hampered. This friction locking is strengthened if at least the central area of the wire section is elastically bent in the mounted state by means of the ring lug.

In order to prevent premature wear of the retaining receptacle and the retaining pin, sliding instruments can be arranged in a manner that allows insertion into the retaining receptacle or they can be arranged in this.

A sliding disc can be provided as the sliding instrument on the base delimiting the retaining receptacle in the respective insertion direction, whereby this sliding disc is made, for example, of aluminium multi-component bronze. The sliding disc protects a front face of a free end of the retaining pin and/or the base of the retaining receptacle against abrasion even under a load, said front face facing in the insertion direction, in the event that the retaining pin should be pressed into the retaining receptacle during operation. The sliding disc can prevent an overload of the spring element that strengthens the friction locking between the retaining element and the wall sections if the retaining pin is pressed into the retaining receptacle during operation. Additionally or alternatively, liquid lubricants can also be located in the retaining receptacle as sliding instruments and a corresponding device for filling, such as lubrication nipples, can be provided.

Furthermore, in an advantageous embodiment, a slide bush can be present as a sliding instrument, arranged in the retaining receptacle and taking up the retaining pin at least in sections. The partial volumes on the side of the fixing frame or of the retaining receptacle are to be arranged accordingly in the slide bush in this embodiment. Alternatively, the sliding instrument can also be formed as a sliding sleeve without a base, said sliding sleeve being formed as a hollow cylinder with a recess that faces the interior for the partial volume of the retaining receptacle and that extends along the longitudinal axis of the retaining pin.

In order to be able to exchange the sliding instrument in the event of wear when the load ring is attached to the goods, the fixing frame can have a maintenance opening with a diameter that corresponds to at least the diameter of the sliding instrument or of the retaining receptacle. Then, however, it is necessary for a closing element to take up the forces acting in the insertion direction and to conduct them into the fixing frame. This is to be fixed to the fixing frame accordingly. Alternatively, the sliding instrument, meaning the sliding sleeve, slide bush or sliding disc, can be arranged on the closing element and developed in such a way that it can be removed together with the closing element.

The design of the fixing frames can also contribute to improving the safety and reliability of the attaching, lifting, or lashing processes, as well as to the simplifying the mounting of the load ring.

The fixing frames can be formed with fixing areas by means of which they can be fixed to the goods. For example, the fixing areas can be developed in such a way that the fixing frames can be screwed to the goods. Often, however, the loads acting on the load ring are so high that the load ring must be connected to the goods in a substance-to-substance locking. In order to obtain the most firm connection possible between the goods and the load ring, the fixing areas can be formed as welding areas.

In order to prevent water from penetrating between the fixing frame and the goods and leading to corrosion, the fixing areas can run circumferentially around the fixing frame and the fixing frames can be continuously welded to the goods in the circumferential fixing areas.

In order to allow welding also in the area of the retaining receptacles, it has proven to be advantageous if the retaining receptacles are formed at a minimum distance from the fixing areas, whereby this minimum distance is roughly one and a half to roughly three times as large, preferably twice as large, as the weld seam that results. If the welding tools are small enough, the distance can also be smaller. If the welding tools, for example, welding electrodes, demand it, the distance can also be larger.

The distance between the retaining receptacles and the goods and the gap that results in this way between the ring lug and the goods also allows the surface of the goods below the ring lug to be processed. For example, the weld seam, a machine part, or a container can consequently be painted even below the ring lug.

Furthermore it is germane to the safety of the goods during the attaching, lifting, and/or lashing of goods that the load ring or the ring lug be loaded at preferred angles. In order for the user of the load ring to be able to check whether the load ring is loaded at the predefined angles, the ring lug and/or at least one of the fixing frames can have angle markings that are arranged along the preferred loading directions. The angle markings can, for example, be engraved or formed into the ring lug and the fixing frames during the manufacturing process of the same.

In the following, the invention is explained by way of example using the embodiments with reference to the drawings. The various features of the embodiments can thereby be combined independently of one another, as was already explained above in the individual advantageous embodiments. Shown are in:

FIGS. 1 to 5 a schematic depiction of a first embodiment of a device according to the invention for attaching, lifting, and/or lashing goods with a load ring;

FIG. 6 a schematic depiction of a further embodiment of the invention along the plane B-B from FIG. 3;

FIG. 7 a schematic depiction of a further embodiment of the device according to the invention along the plane A-A from FIG. 1;

FIG. 8 a schematic depiction of a variant of the embodiment from FIG. 7 in a front view;

FIGS. 9, 10 a schematic depiction of a further embodiment of the fixing frame according to the invention along the plane C-C from FIG. 2;

FIGS. 11, 12 a schematic depiction of a further embodiment of the invention along the plane C-C from FIG. 2 and D-D from FIG. 3;

FIGS. 13, 14 a schematic depiction of a further embodiment of the invention along the plane C-C from FIG. 2 and D-D from FIG. 3;

FIG. 15 a schematic depiction of a detail of a further embodiment of the invention in a sectional view along the plane C-C from FIG. 2;

FIG. 16 a schematic depiction of a further embodiment of the invention in a section along the plane C-C from FIG. 2;

FIG. 17 a schematic depiction of a further embodiment of the invention in a section along the plane D-D from FIG. 3;

FIGS. 18, 19 a schematic depiction of a further embodiment of the invention in a section along the plane C-C from FIG. 2 and in a side view;

FIG. 20 a schematic depiction of a further embodiment of the invention in a section along the plane C-C from FIG. 2;

FIGS. 21, 22 a schematic depiction of a further embodiment of the invention.

The cutting planes A-A, B-B, C-C and D-D of the embodiment from FIGS. 1 to 3 are also used, as follows from the above figure descriptions, to explain the other embodiments.

First the construction and function of a device according to the invention for attaching, lifting, and/or lashing goods are explained with reference to the embodiment from FIGS. 1 to 5.

FIG. 1 shows a load ring 1 with a ring lug 2 and two fixing frames 3a, 3b. The load ring 1 is attached to the goods 4 by way of the fixing frames 3a, 3b, for example, to the outer wall of a container.

A support ring 5 of the ring lug 2 arranged in the drawing plane encloses an essentially circular attachment opening 6 into which an attaching means can engage. On the side of the support ring 5 that faces the goods 4, two retaining pins 7a, 7b join to the support ring 5 and run essentially parallel to the goods 4 and point away from each other in an aligned manner. The retaining pins 7a, 7b are inserted into retaining receptacles 8a, 8b of the fixing frames 3a, 3b and are arrested in these by means of the axial securing element X described in the following with reference to FIGS. 3 to 5. The fixing frames 3a, 3b connected to the support ring 5 by way of the retaining pins 7a, 7b are preferably fixed to the goods 4 by way of weld seams 9a, 9b that run around the circumference of the respective fixing frame 3a, 3b.

The load ring 1 can be connected to the goods 4 as a pre-mounted unit and, for example, before the fixing frames 3a, 3b are welded to the goods 4, can be put together from individual pieces of a kit.

The load ring 1 is constructed so as to be essentially mirror-symmetrical to a plane of symmetry Z arranged perpendicular to the goods 4 and the ring lug 2, whereby the cutting plane A-A runs along the plane of symmetry Z.

Between the retaining pins 7a, 7b, the ring lug 2 has an essentially straight-formed retaining bar 10 from which the support ring 5 and the retaining pins 7a, 7b originate. The retaining bar 10 is particularly arranged at a distance D from the goods 4 in the area of the retaining pins 7a, 7b by means of the fixing frames 3a, 3b.

Fixing areas B, B' of the fixing frames 3a, 3b are fixed to the goods 4 by way of the weld seams 9a, 9b that run around the fixing frames 3a, 3b, respectively. The height h of the weld seams 9a, 9b measured parallel to the distance D is roughly half as large as the distance D, which can also be more than twice as large as the height h. The distance D can also be less than twice the height h of the weld seams 9a, 9b, as long as the weld seams 9a, 9b can also be formed between the retaining bar 10 and the goods 4.

One or more angle markings 11a to 11e are provided on the ring lug 2, whereby these angle markings are arranged with reference to the plane of symmetry Z and a central point M of the attachment opening 6 at predefined angles of 0°, 45° and 60°. The angle markings 11a to 11e are thereby located on an essentially circular ring reference line indicated in FIG. 1 and marked with the reference number 12, whereby the central point of this ring reference line roughly corresponds to the central point M of the attachment opening 6 and whereby this ring reference line is depicted essentially centred on the ring lug 2. The angle markings 11a to 11e are formed on both sides of the plane of symmetry Z and can, for example, be stamped in.

FIG. 2 shows the embodiment from FIG. 1, whereby the same reference numbers are used for elements that correspond in function and/or construction to elements of the embodiment of FIG. 1 and the load ring 1 is shown schematically in a top view on to the goods 4.

The cutting plane C-C runs through the fixing frame 3a and the retaining pin 7a along a plane of symmetry Y that essentially cuts the support ring 5 into two equal circular halves.

The ring lug 2 is connected to the fixing frames 3a, 3b by way of the retaining pins 7a, 7b and the retaining receptacles 8a, 8b in a pivoting manner. If the ring lug 2 is pivoted, for example, in or opposite to a direction S, the retaining pins 7a, 7b, which are aligned with each other, rotate in the retaining receptacles 8a, 8b around their longitudinal axis 13 which is arranged in the plane of symmetry Y, whereby this longitudinal axis 13 essentially concurs with the longitudinal axis of the retaining receptacles 8a, 8b.

The fixing frames 3a, 3b can likewise be provided with one or more angle markings 11f to 11m on their sections, which are arranged spaced at a distance from the fixing areas B, B'. The angle markings 11f to 11m are then also easily visible in an area of the load ring 1 facing away from the goods 4 when this load ring 1 is fixed to the goods 4. The angle markings 11f to 11m indicate pivot positions, for example, 45° or 60°, of the ring lug 2 with respect to the fixing or central position shown here, in which the ring lug 2 is arranged such that it is aligned essentially perpendicular to the goods 4 or in the plane of symmetry Y. Naturally the angle markings 11f to 11m can also be arranged at other angular positions.

In FIG. 3, the load ring 1 is shown cut along the plane C-C shown in FIG. 2, whereby the fixing frame 3a and the retaining pin 7a are shown enlarged.

The retaining pin 7a is inserted almost completely into the retaining receptacle 8a. It is discernible in this sectional view that the essentially circular-cylindrically formed retaining pin 7a is formed with a recess 15 on its outside surface 14 that essentially runs parallel to its longitudinal axis 13, whereby this recess 15 can be formed to run circumferentially around the longitudinal axis 13 of the retaining pin 7a on its outer surface 14. The circumferential recess 15 can lie opposite a selected location of an inner surface 16 of the retaining receptacle 8a regardless of the pivoting position of the ring lug 2. The recess 15 delimits a free partial volume 17 of a reception volume A belonging to the axial securing element X.

FIG. 4 schematically shows a fixing frame 3a in a sectional view indicated along the plane D-D from FIG. 3. The retaining pin 7a extends perpendicularly to the drawing plane and is shown cut essentially at the level of its recess 15. The partial volume 17 is shown between the inner surface 16 of the retaining receptacle 8a and the recess 15 of the retaining pin 7a as a ring-shaped gap. The diameter of the retaining pin 7a is reduced by the recess 15 in comparison to other positions along its longitudinal axis 13.

A hollow cylindrical opening 18 that runs perpendicularly to the goods 4 and that cuts the retaining receptacle 8a in sections at its edge is provided in the fixing frame 3a. The opening 18 ends in a bottom side 19 of the fixing frame 3a whereby this bottom side 19 faces the goods 4 and is arranged at a distance from the same. Because of the circumferential weld seam 9a, the bottom side 19 borders a hermetically sealed free volume V between the goods 4 and the fixing frame 3a.

The opening 18 contains a further partial volume 20 of the reception volume A of the axial securing element X. The axial securing element X furthermore comprises a retaining element 21 that in this embodiment is formed in a pin shape and that is shown completely inserted into the opening 18. The retaining element 21 thereby also juts into the partial volume 17 delimited by the recess 15 of the retaining pin 7a and lies against the recess 15 or the retaining pin 7a in sections. The diameter T of the opening 18 measured parallel to the goods 4 is larger than the diameter t of the pin-shaped retaining element 21 at least in an intersection area O in which the partial volumes 17, 20 overlap at least partially.

The pin-shaped retaining element 21 is shown elastically deformed in the intersection area O by the retaining pin 7a and exerts a restoring force on the retaining pin 7a that runs transverse to the longitudinal axis 13 of the retaining pin 7a.

The schematic sectional depiction of the fixing frame 3a and of the retaining pin 7a shown in FIG. 5 corresponds to a sectional top view on the load ring 1 or the goods 4.

The pin-shaped retaining element 21 is arranged in the area O, in which the partial volumes 17, 20 combine to the reception volume A, whereby the retaining element 21 can be formed as a spring steel wire. The retaining element 21 lies in the recess 15 on the retaining pin 7a and in the opening 18 on the fixing frame 3b. If it is now attempted to displace the retaining pin 7a from its working position P shown here along an insertion direction R facing parallel to its longitudinal axis 13 and into the retaining receptacle 8a, the retaining element 21 bumps into wall sections 22, 23 of the recess 15 or of the opening 18, whereby these wall sections face opposite or in the insertion direction R. The retaining element 21 consequently prevents a removal of the retaining pin 7a from the retaining receptacle 8a. If the retaining pin 7a is slid farther into the retaining receptacle 8a, the retaining element 21 lies on wall sections 24, 25 of the opening 18 or of the recess 15, whereby these wall sections 24, 25 face opposite or in the insertion direction R.

FIG. 6 shows a variant of the retaining element 21, which here is formed, not as a spring steel wire, but instead as a hollow cylindrical tension sleeve with elastically deformable transverse slot, which can be manufactured from spring steel, whereby this tension sleeve is slit along its longitudinal direction facing out of the drawing plane.

Figure 5:
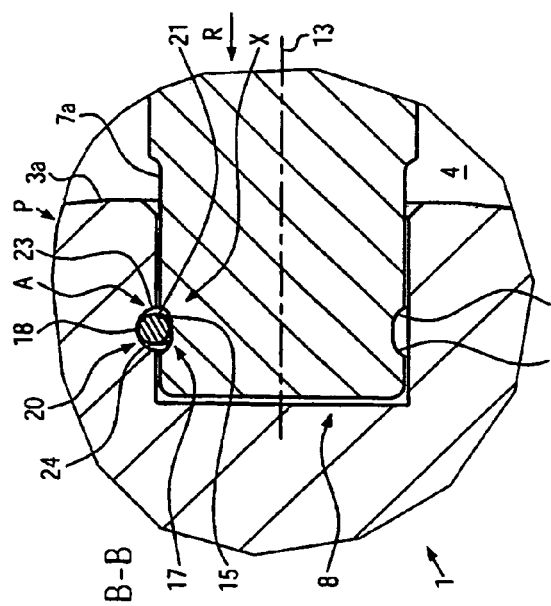
Figure 7:
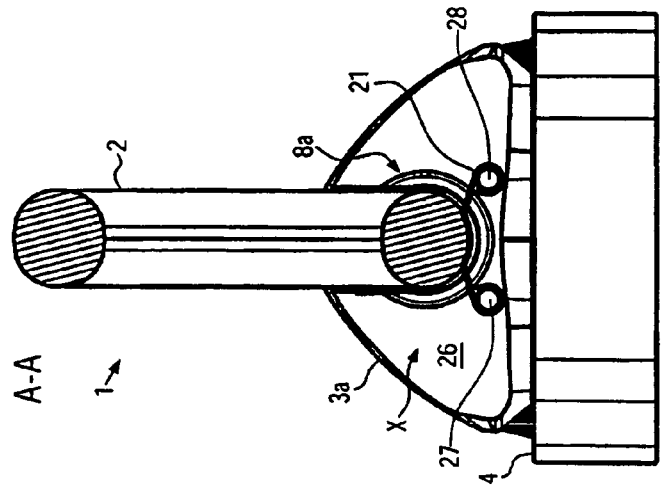
FIG. 7 shows a further embodiment of the device according to the invention, whereby the same reference numbers are used for elements that correspond in function and/or construction to elements of the embodiments of the FIGS. 1 to 6. For the sake of brevity, only the differences to the embodiments of the previous figures are discussed.
Figure 6:
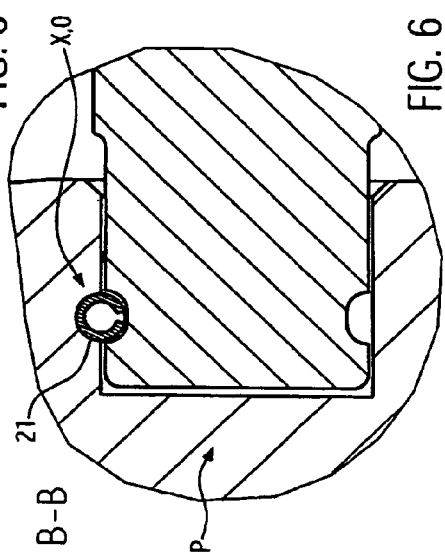
FIG. 6 shows a further embodiment of the invention, whereby the same reference numbers are used for elements that correspond in function and/or construction to elements of the embodiments of the previous FIG. 5. For the sake of brevity, only the differences to the embodiments of the previous figures are discussed.

The load ring 1 is depicted cut along the plane A-A from FIG. 1. The retaining element 21 is formed here as a wire section, particularly from flat steel wire, which can, for example, be pre-formed spring steel. The wire section is fixed to holders provided in a face side 26 of the fixing frame 3a in a positive-locking manner. The ends of the wire section are bent into loops that are placed or pressed onto holders in the form of fixing pins 27, 28. Between the ends of the wire section, this wire section can be formed as an elastically deformable bow that can be arranged in front of the retaining receptacle 8a or that can jut into the same.

The fixing pins 27, 28 are shown here arranged at an equal distance to the goods 4. At least one of the fixing pins 27, 28 can, however, also be at a larger or smaller distance to the goods 4 and can be formed in such a way that the wire section or the fixing pin 27, 28 limits a pivoting of the ring lug 2 beyond a certain angle and consequently defines a maximum pivot position of the ring lug 2.

As in the previous and coming embodiments, it can suffice if the retaining element 21 is connected to the retaining pin 7a and/or the retaining receptacle 8a with a friction locking and consequently at least impedes the movement of the retaining pin 7a in the retaining receptacle 8a along its longitudinal axis. The wire section can, however, alternatively also jut into the recess 15 of the retaining pin 7a here, if this is displaced further towards the middle of the retaining bar 10, for example. The retaining pin can consequently also be connected to the wire section in a positive locking manner. In this way, the retaining pin 7a is secured against movements at least opposite to the insertion direction R facing into the drawing plane. The recess can be provided in a portion of the retaining pin 7a whereby this portion is arranged outside the retaining receptacle 8a.

The retaining element 21 can also prevent unwanted pivoting or tipping of the ring lug 2 in all embodiments. In particular, a tipping caused by the own weight of the ring lug 2 can be prevented, so that the ring lug 2 does not self-actuatingly change its position and hit against the goods 4. Noise produced by the striking of the ring lug 2 against the goods 4 is prevented.

Figure 8:
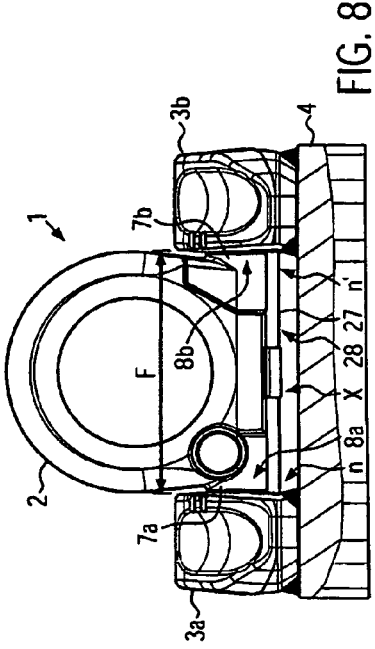

FIG. 8 shows a further embodiment of the device according to the invention, whereby the same reference numbers are used for elements that correspond in function and/or construction to elements of the embodiments of FIGS. 1 to 7. For the sake of brevity, only the differences to the embodiments of the previous figures are discussed.

FIG. 8 shows a variant of the load ring 1 in which the fixing pins 27, 28 are arranged between the goods 4 and the ring lug 2 in a manner that they connect the two fixing frames 3a, 3b to each other. The ring frames 3a, 3b are fixed to the goods 4 at a distance from each other in their working distance F, whereby the working distance F is limited towards low values by the fixing pins 27, 28, with the fixing pins 27, 28 fulfilling the function of spacing bars.

The fixing pins 27, 28 jut into pin receptacles n, n' provided in the fixing frames. The pin receptacles n, n' can, for example, be formed as blind holes provided in the fixing frames 3a, 3b, whereby each of the open ends of these blind holes in the mounted state of the load ring 1 faces the other fixing frame 3a, 3b. The fixing pins 27, 28 can be connected to at least one of the fixing frames 3a, 3b in a positive, frictional or substance-to-substance locking and particularly undisplaceable manner, so that the fixing pins 27, 28 not only limit the working distance F downwards, but also absolutely determine it. If the fixing pins 27, 28 are connected to the two fixing frames 3a, 3b in an undisplaceable manner, they determine the working distance F and consequently also the working position of the retaining pins 7a, 8a in the retaining receptacles 8a, 8b. The fixing pins 27, 28, particularly together with the pin receptacles n, n', form the axial securing element X.

FIGS. 9 and 10 show a further embodiment of the device according to the invention, whereby the same reference numbers are used for elements that correspond in function and/or construction to elements of the embodiments of FIGS. 1 to 8. For the sake of brevity, only the differences to the embodiments of the previous figures are discussed.

The retaining receptacle 8a in this embodiment does not end in the fixing frame 3a. Rather it continues in a maintenance opening 29. The maintenance opening 29 connects the retaining receptacle 8a to an outer side 30 of the fixing frame 3a, whereby this outer side 30 lies opposite the face side 26. For example, when needed, a lubricant can be introduced into the fixing frame 3a via the maintenance opening 29, and with the help of this lubricant the retaining pin 7a can rotate in the retaining receptacle 8a particularly under load especially uniformly and quietly. The maintenance opening 29 is formed in such a manner that it can be closed and, in the embodiment shown here, it has a closing screw 31 that is screwed into the maintenance opening 29. The space in the maintenance opening 29 that is not taken up by the closing screw 31 is available as a reserve volume for the possibly liquid lubricant.

A sliding instrument in the form of a sliding disc 34 is arranged between a free end 32 of the retaining pin 7a that faces in an insertion direction R and a base 33 of the retaining receptacle 8a that is opened by the maintenance opening 29. If during the operation of the load ring 1 a force in the insertion direction R acts on the ring lug 2, the retaining pin 7a can be moved farther into the retaining receptacle 8a until it strikes the sliding disc 34. The sliding disc 34 determines a maximum insertion position of the retaining pin 7a in the retaining receptacle 8a and allows, as a solid lubricant, a gentle rotating of the retaining pin 7a that is without jerking and quiet even under load, whereby the retaining pin 7a slides, fitting against the sliding disc 34, over it at least under load. The sliding disc 34 can, for example, be manufactured from aluminium bronze, aluminium multi-component bronze or from another mechanically loadable lubricant.

FIG. 10 shows the embodiment of FIG. 9 in an enlarged depiction, whereby the same reference numbers are used for elements that correspond in function and/or construction to elements of the embodiment of FIG. 9.

The partial volume 20 formed by the retaining receptacle 8a here also has wall sections 25 facing in the latching direction R and running perpendicular to the latching direction R, whereby the partial volume 20 is delimited by a set-off forming a circumferential retaining channel 35 in the inner surface 16 of the retaining receptacle 8a. The diameter of the retaining receptacle 8a is increased in the area of the partial volume.

The wall sections 24 of the retaining channel 35 recessed into the inner surface 16, said wall sections facing away from the fixing direction R, are formed as ramp-shaped leading bevels and connect the bottom 36 of the retaining channel 35 continuously to the inner surface 16 of the retaining receptacle 8a.

If a force acting in the insertion direction R now acts on the ring lug 2 and if this is then as a result slid farther into the retaining receptacle 8a in the insertion direction R, the retaining element 21 is transferred into an evasion position lying in the recess 15 due to the ramp-shaped leading bevel 24. The cross-section of the recess 15 corresponds at least to that of the retaining element 21, so that this retaining element 21 can essentially completely dip into the recess 15.

Alternatively, the wall section 25 of the recess 15, said wall section 25 facing in the insertion direction R, can also be formed in a ramp-like shape as a leading bevel, so that the retaining element 21 can be pressed into the securing position now provided in the retaining channel 35.

FIGS. 11 and 12 show a further embodiment of the invention, whereby the same reference numbers are used for elements that correspond in function and/or construction to elements of the embodiments of the FIGS. 1 to 10. For the sake of brevity, only the differences to the embodiments of the FIGS. 1 to 10 are discussed.

The fixing frame 3a is shown in a sectional view along the plane D-D shown in FIG. 3. The retaining pin 7a is arranged in the retaining receptacle 8a in its working position P. The reception volume A is put together from the partial volumes 17, 20 and has a ring or torus shape. The retaining element 21 is formed as a retaining ring that has a straight shape in sections and that juts into the two partial volumes 17, 20. The retaining element 21 is, at least in sections and particularly in the section with the straight shape, elastically deformed and exerts a restoring force on the retaining pin 7a and the retaining receptacle 8a, which are radially and axially held or clamped by means of the retaining element 21.

FIG. 12 shows the embodiment of FIG. 10, whereby the same reference numbers are used for elements that correspond in function and/or construction to elements of the embodiment of FIG. 11.

The fixing frame 3a and the retaining pin 7a are depicted schematically in an enlarged sectional view along the plane C-C shown in FIG. 2. The sliding disc 34 is arranged on the base 33 of the retaining receptacle 8a. The base 33 is not opened by a maintenance opening 29. The circumferential retaining channel 35 provided in the inner surface 16 of the retaining receptacle 8a is here again developed with a ramp-shaped wall section 24, by means of which the retaining channel 35, which is rotation-symmetric around the longitudinal axis of the retaining receptacle 8a, is given a funnel-shaped cross-section.

It is easily evident that the ring-shaped retaining element 21 engages in sections in the recess 15 of the retaining pin 7a and in the set-off formed as a retaining channel 35. The diameter of the retaining receptacle 8a can thereby alternatively be rapidly increased by the set-off in the insertion direction R and remain increased up to the base 33. The retaining channel 35 can consequently extend to the base 33, whereby the retaining pin 7a continues to be secured against unwanted removal from the retaining receptacle 8a by means of the axial securing element X.

Figure 13:
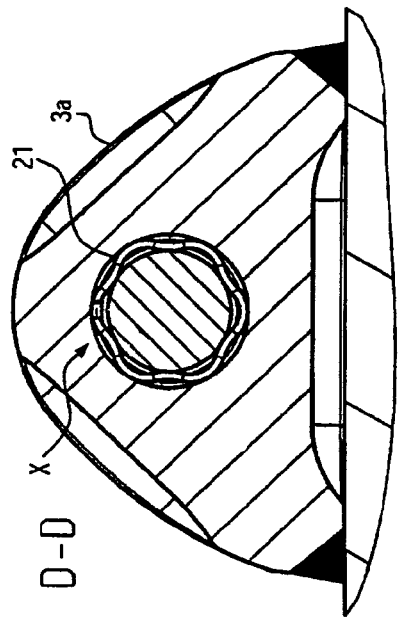
Figure 14:
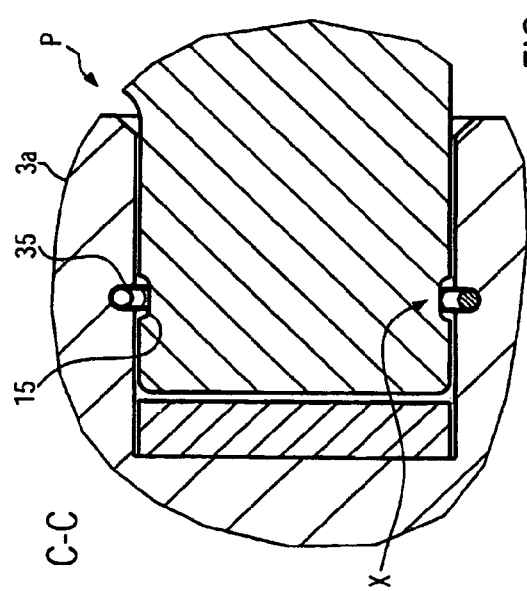

FIGS. 13 and 14 show a further embodiment, whereby the same reference numbers are used for elements that correspond in function and/or construction to elements of the embodiments of FIGS. 1 to 12. For the sake of brevity, only the differences to the embodiments of the previous figures are discussed.

FIGS. 13 and 14 show the fixing frame 3a along the plane C-C shown in FIG. 2 and the sectional, schematic views of the plane D-D shown in FIG. 3. The retaining element 21 is shown as an essentially star-shaped retaining ring whose wave-like set-offs and projections alternatingly jut into the recess 15 and the retaining channel 35. The retaining element 21, which resembles a ring that is deformed sinusoidally in the radial direction or in stretched epicycloidical manner, is elastically deformable and in particular has a changeable diameter. For example, the retaining element 21 can be formed as a snap ring or an elastically deformable and essentially torus-shaped flat disc.

The retaining element 21 is elastically deformed at least in sections and exerts a restoring force on the retaining pin 7a and the retaining receptacle 8a, which are radially and axially held or clamped by means of the retaining element 21.

Figure 15:
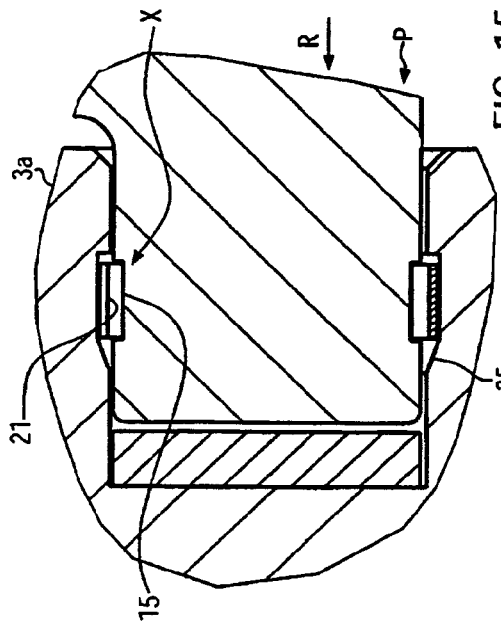

FIG. 15 shows a further embodiment of the device according to the invention, whereby the same reference numbers are used for elements that correspond in function and/or construction to elements of the embodiments of the previous figures. For the sake of brevity, only the differences to the embodiments of the FIGS. 1 to 14 are discussed.

In FIG. 15, the fixing frame 3a is depicted in a sectional view along the plane C-C. The retaining element 21 has the star- and ring-shaped cross-section of the retaining element 21 depicted in FIGS. 12 and 13. However the retaining element here is formed with a hollow cylinder shape instead of a torus shape. In particular, a longitudinal axis of the retaining element 21 shown here runs parallel to the insertion direction R so that the retaining element 21 extends in the insertion direction R and around its longitudinal axis. The retaining element of this embodiment can likewise be manufactured from flat steel wire. The recess 15 and the retaining channel 35 are adapted to the shape of the retaining element 21 in the insertion direction R, and in particular are shaped complementary to this at least in sections.

The retaining element 21 is elastically deformed at least in sections and exerts a restoring force that is stronger than in the embodiment of FIG. 13 on the retaining pin 7a and the retaining receptacle 8a, which are radially and axially held or clamped by the retaining element 21.

Figure 16:
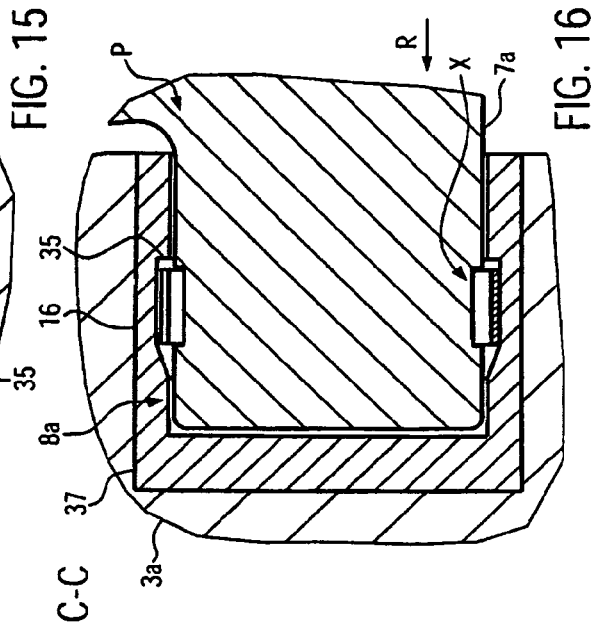

FIG. 16 shows a further embodiment of the device according to the invention, whereby the same reference numbers are used for elements that correspond in function and/or construction to elements of the embodiments of FIGS. 1 to 15. For the sake of brevity, only the differences to the embodiments of the previous figures are discussed.

It is apparent on the basis of the schematically depicted sectional view that the edges of the sliding instrument extend opposite to the insertion direction R and along the inner surfaces 16 of the retaining receptacle 8a. The slide bush 37 formed in this way comprises the retaining channel 35, is solidly connected to the fixing frame 3a, and is depicted placed on the retaining pin 7a.

FIG. 17 shows a further embodiment of the device according to the invention, whereby the same reference numbers are used for elements that correspond in function and/or construction to elements of the embodiments of FIGS. 1 to 16. For the sake of brevity, only the differences to the embodiments of the previous figures are discussed.

The fixing frame 3a and the retaining pin 7a are depicted in a sectional view along the plane D-D shown in FIG. 3. The retaining pin 7a has a toothed gear-like cross-section, at least in sections, whereby the valleys arranged between the teeth form partial volumes 17a, 17b, 17c, etc., which are distributed along the circumference of the retaining pin 7a. The teeth can be arranged at least partially in the recess 15 of the retaining pin 7a so that the partial volumes 17a, 17b, 17c, etc. are delimited opposite to the insertion direction R by means of the wall sections 22, 25 that run at least partially parallel to the pivot direction S. At least when the retaining pin 7a is moved opposite to the insertion direction R out of the retaining receptacle 8a and the partial volumes 17a, 17b, 17c, etc. are delimited at least by the wall section 22, this acts as a limit stop for the retaining element 21 and secures the retaining pin 7a together with the retaining element 21 in its working position P.

The partial volume 20 of the fixing frame 3a is formed as a hollow cylindrical reception opening 38 that is radial to the retaining receptacle 8a and that connects the free volume V to the retaining receptacle 8a. The retaining element 21 is arranged in the reception opening 38 in an essentially undisplaceable manner, juts with one end 39 into the retaining receptacle 8a and engages in one of the partial volumes of the retaining pin 7a. The end 39 of the retaining element 21 is elastically deflectable in the direction towards the volume V.

For example, the retaining element 21 of this embodiment can be formed as a spherical-headed screw whose spherical head is springily supported and juts into one of the partial volumes of the retaining pin 7a. If the ring lug 2 is pivoted, the teeth press the spherical head into the spherical-headed screw, whereby the spherical head springs back into the next partial volume in the following. The retaining element 21 can have a water-tight connection to the reception opening 38 and the volume V can also be hermetically sealed here.

FIGS. 18, 19 show a further embodiment of the device according to the invention, whereby the same reference numbers are used for elements that correspond in function and/or construction to elements of the embodiments of FIGS. 1 to 17. For the sake of brevity, only the differences to the embodiments of the previous figures are discussed.

FIG. 18 shows the fixing frame 3a and the retaining pin 7a schematically in a section along the plane C-C depicted in FIG. 2. The maintenance opening 29 has a greater diameter than the retaining receptacle 8a. The sliding disc 34 or the slide bush 37, which is not shown here, can consequently be removed through the maintenance opening 29. For simple removal of the sliding disc 34, it has a ventilation opening 40 running parallel to the insertion direction R through which lubricant can also penetrate.

Because not insignificant forces that act in the insertion direction R can create a load on the sliding disc 34 during operation, the sliding disc 34 is secured by means of a closing element 41 arranged in the maintenance opening 29. The closing element 41 is shown as a closing screw 31 and can be solidly connected to the fixing frame 3a by means of further fixing screws 42. The forces and moments acting on the closing screw 31 are led to the fixing screws 42 by way of a staggered tooth system 43.

FIG. 19 shows the fixing frame 3a in a side view facing opposite to the insertion direction R. The fixing screws 42, 42' depicted in this view are screwed to the fixing frame 3a and fix in place a latch 44, which lies preferably flat on the flatly formed outer side 30 of the fixing frame 3a. The closing screw 31 has two fixing channels 45, 45' that run crosswise to each other and that are formed in a head 46 of the closing screw 31 that protrudes from the maintenance opening 29 in the insertion direction R. The latch 44 engages in the fixing channel 45 that runs parallel to the goods 4, which are not shown here.

The closing screw 31 is secured against unwanted rotations by means of the latch 44 and the fixing channel 45. When the retaining pin 7a attempts to rotate the closing screw 31, this cannot rotate significantly because at least one of the fixing elevations 47a to 47d flanking the fixing channels 45, 45' at least in sections strikes against the latch 44 which is however connected to the fixing frame 3a in an unmoveable manner by the attachment screws 42, 42'.

FIG. 20 shows a further embodiment of the invention, whereby the same reference numbers are used for elements that correspond in function and/or construction to elements of the embodiments of FIGS. 1 to 19. For the sake of brevity, only the differences to the embodiments of the previous figures are discussed.

The fixing frame 3a and the retaining pin 7a are also cut here along the plane C-C shown in FIG. 2. The retaining pin 7a is arranged in its working position P in the retaining receptacle 8a. A pre-tensioned spring element 48 presses against the free end 32 of the retaining pin 7a and supports itself on the base 33 of the retaining receptacle 8a. The sliding disc 34 lies on the free end 32 of the retaining pin 7a, whereby this sliding disc 34 is arranged in the interior of the spring element 48 that is formed as a coil spring. The spring element 48 increases the friction between the retaining element 21 and the fixing frame 3a as well as the retaining pin 7a, as a result of which even a heavy ring lug 2 cannot tip unintentionally. The sliding disc 34 here also limits the mobility of the retaining pin 7a in the insertion direction R and in this way prevents an overload of the spring element 48.

The described embodiments of the fixing frame 3a and of the retaining pin 7a can also be applied to the fixing frame 3b and the retaining pin 7b.

FIGS. 21 and 22 show a further embodiment of the device according to the invention, whereby the same reference numbers are used for elements that correspond in function and/or construction to elements of the embodiments of FIGS. 1 to 20. For the sake of brevity, only the differences to the embodiments of the previous figures are discussed.

FIG. 21 shows the load ring 1 in the frontal view also depicted in FIG. 1. FIG. 22 shows the load ring 1 in a side view. The fixing areas B, B' of the fixing frames 3a, 3b are fixed to the goods 4 by way of connection screws 49 to 52. For this purpose, the fixing areas B, B' have receptacles for the connection screws 49 to 52, said receptacles facing away from the goods 4. In order to create enough room for the receptacles of the connection screws 49 to 52 and nevertheless still obtain sufficient material for forming load-resistant fixing areas B, B', the fixing areas B, B' run parallel to the goods 4 and away from the retaining receptacles 8a, 8b.

The invention claimed is:

1. Device for attaching, lifting, and/or lashing goods, comprising a load ring (1), which has a ring lug (2) with two retaining pins (7a, 7b), and two fixing frames (3a, 3b), which in turn can be fixed to goods (4), wherein each fixing frame (3a, 3b) has a retaining receptacle (8a, 8b) in which the ring lug (2) is held by way of its retaining pins (7a, 7b), characterised by at least one axial securing element (X) by means of which the retaining pin (7a, 7b) is secured in the retaining receptacle (8a, 8b) in a predetermined axial working position (P);
the axial securing element (X) has a retaining element (21) and a reception volume (A) formed in the retaining pins (7a, 7b) and/or in the fixing frames (3a, 3b), in which reception volume the retaining element (21) is held in the working position (P); wherein in the event of a movement of the retaining pins (7a, 7b) out of the retaining receptacles (8a, 8b), the retaining element (21) applies a retaining force that counteracts the movement and introduces the retaining force into the fixing frames (3a, 3b);
the retaining element (21) can be transferred into a securing position arranged in the reception volume (A) in the event that a predefined axial force is exceeded; and a sliding instrument lying opposite a free end (32) of the retaining pins (7a, 7b) is arranged in the retaining receptacles (8a, 8b).

2. Device for attaching, lifting, and/or lashing goods, comprising a load ring (1), which has a ring lug (2) with two retaining pins (7a, 7b), and two fixing frames (3a, 3b), which in turn can be fixed to goods (4), wherein each fixing frame (3a, 3b) has a retaining receptacle (8a, 8b) in which the ring lug (2) is held by way of its retaining pins (7a, 7b), characterised by at least one axial securing element (X) by means of which the retaining pin (7a, 7b) is secured in the retaining receptacle (8a, 8b) in a predetermined axial working position (P); the axial securing element (X) has a retaining element (21) and a reception volume (A) formed in the retaining pins (7a, 7b) and/or in the fixing frames (3a, 3b), in which reception volume the retaining element (21) is held in the working position (P);
wherein in the event of a movement of the retaining pins (7a, 7b) out of the retaining receptacles (8a, 8b), the retaining element (21) applies a retaining force that counteracts the movement and introduces the retaining force into the fixing frames (3a, 3b).

3. Device according to claim 2, characterised in that the retaining pins (7a, 7b) and the retaining receptacles (8a, 8b) are latched to each other by means of the axial securing element (X).

4. Device according to claim 2, characterised in that the retaining pins (7a, 7b) are arranged in the retaining receptacles (8a, 8b) in such a way that said retaining pins can be rotated around their longitudinal axis (13).

5. Device according to claim 4, characterised in that the axial securing element (X) is connected to the ring lug (2) at least partially in a positive locking or friction locking manner and in a manner that applies a force opposite to the rotation of the retaining pins (7a, 7b).

6. Device according to claim 2, characterised in that the ring lug (2) and/or at least one of the fixing frames (3a, 3b) has angle markings (11a-11m) that are arranged at a predefined distance from each other and/or from an edge area of the ring lug (2) and/or of the at least one fixing frame (3a, 3b).

7. Device according to claim 2, characterised in that the fixing frames (3a, 3b) are formed with circumferential fixing areas (B, B') and are welded to the goods (4) in these areas continuously.

8. Device according to claim 2, characterised in that the device comprises at least one fixing pin (27, 28) that connects the fixing frames (3a, 3b) to each other in an undisplaceable manner in the mounted state of the load ring (1).

9. Device according to claim 2, characterised in that the retaining element (21) is elastically deformable.

10. Device according to claim 2, characterised in that the retaining element (21) can be transferred into a securing position arranged in the reception volume (A) in the event that a predefined axial force is exceeded.

11. Device for attaching, lifting, and/or lashing goods, comprising a load ring (1), which has a ring lug (2) with two retaining pins (7a, 7b), and two fixing frames (3a, 3b), which in turn can be fixed to goods (4), wherein each fixing frame (3a, 3b) has a retaining receptacle (8a, 8b) in which the ring lug (2) is held by way of its retaining pins (7a, 7b), characterised by at least one axial securing element (X) by means of which the retaining pin (7a, 7b) is secured in the retaining receptacle (8a, 8b) in a predetermined axial working position (P); the axial securing element (X) has a retaining element (21) and a reception volume (A) formed in the retaining pins (7a, 7b) and/or in the fixing frames (3a, 3b), in which reception volume the retaining element (21) is held in the working position (P);

wherein the retaining element (21) can be transferred into a securing position arranged in the reception volume (A) in the event that a predefined axial force is exceeded.

12. Device according to claim 11, characterised in that the retaining element (21) is elastically deformable.

13. Device according to claim 11, characterised in that the retaining pins (7a, 7b) and the retaining receptacles (8a, 8b) are latched to each other by means of the axial securing element (X).

14. Device according to claim 11, characterised in that the retaining pins (7a, 7b) are arranged in the retaining receptacles (8a, 8b) in such a way that said retaining pins can be rotated around their longitudinal axis (13).

15. Device according to claim 14, characterised in that the axial securing element (X) is connected to the ring lug (2) at least partially in a positive locking or friction locking manner and in a mariner that applies a force opposite to the rotation of the retaining pins (7a, 7b).

16. Device according to claim 11, characterised in that the ring lug (2) and/or at least one of the fixing frames (3a, 3b) has angle markings (11a-11m) that are arranged at a predefined distance from each other and/or from an edge area of the ring lug (2) and/or of the at least one fixing frame (3a, 3b).

17. Device according to claim 11, characterised in that the fixing frames (3a, 3b) are formed with circumferential fixing areas (B, B') and are welded to the goods (4) in these areas continuously.

18. Device according to claim 11, characterised in that the device comprises at least one fixing pin (27, 28) that connects the fixing frames (3a, 3b) to each other in an undisplaceable manner in the mounted state of the load ring (1).

19. Device for attaching, lifting, and/or lashing goods, comprising a load ring (1), which has a ring lug (2) with two retaining pins (7a, 7b), and two fixing frames (3a, 3b), which in turn can be fixed to goods (4), wherein each fixing frame (3a, 3b) has a retaining receptacle (8a, 8b) in which the ring lug (2) is held by way of its retaining pins (7a, 7b), characterised by at least one axial securing element (X) by means of which the retaining pin (7a, 7b) is secured in the retaining receptacle (8a, 8b) in a predetermined axial working position (P);

wherein a sliding instrument lying opposite a free end (32) of the retaining pins (7a, 7b) is arranged in the retaining receptacles (8a, 8b).

20. Device according to claim 19, characterised in that the axial securing element (X) has a retaining element (21) and a reception volume (A) formed in the retaining pins (7a, 7b) and/or in the fixing frames (3a, 3b), in which reception volume the retaining element (21) is held in the working position (P).

21. Device according to claim 20, characterised in that the retaining element (21) is elastically deformable.

22. Device according to claim 19, characterised in that the sliding instrument is formed as a sliding disc (34) manufactured from aluminium multi-component bronze.

23. Device according to claim 19, characterised in that the sliding instrument is formed as a slide bush (37) manufactured from aluminium multi-component bronze wherein the retaining pin (7a, 7b) can be arrested in the slide bush (37).

24. Device according to claim 19, characterised in that the fixing frame (3a, 3b) is formed with a maintenance opening (29) through which the sliding instrument can be removed when the loading ring (1) is in its mounted state.

25. Device according to claim 19, characterised in that the retaining pins (7a, 7b) and the retaining receptacles (8a, 8b) are latched to each other by means of the axial securing element (X).

26. Device according to claim 19, characterised in that the retaining pins (7a, 7b) are arranged in the retaining receptacles (8a, 8b) in such a way that said retaining pins can be rotated around their longitudinal axis (13).

27. Device according to claim 26, characterised in that the axial securing element (X) is connected to the ring lug (2) at least partially in a positive locking or friction locking manner and in a manner that applies a force opposite to the rotation of the retaining pins (7a, 7b).

28. Device according to claim 19, characterised in that the ring lug (2) and/or at feast one of the fixing frames (3a, 3b) has angle markings (11a-11m) that are arranged at a predefined distance from each other and/or from an edge area of the ring lug (2) and/or of the at least one fixing frame (3a, 3b).

29. Device according to claim 19, characterised in that the fixing frames (3a, 3b) are formed with circumferential fixing areas (B, B') and are welded to the goods (4) in these areas continuously.

30. Device according to claim 19, characterised in that the device comprises at least one fixing pin (27, 28) that connects the fixing frames (3a, 3b) to each other in an undisplaceable manner in the mounted state of the load ring (1).

* * * * *

UNITED STATES PATENT AND TRADEMARK OFFICE
CERTIFICATE OF CORRECTION

PATENT NO. : 8,807,617 B2  
APPLICATION NO. : 13/261203  
DATED : August 19, 2014  
INVENTOR(S) : Reinhard Smetz et al.

It is certified that error appears in the above-identified patent and that said Letters Patent is hereby corrected as shown below:

In the Claims

Column 17, Line 20: Delete "mariner" and substitute --manner--.

Column 18, Line 34: Delete "feast" and substitute --least--.

Signed and Sealed this  
Seventh Day of October, 2014

Michelle K. Lee  
*Deputy Director of the United States Patent and Trademark Office*